(12) United States Patent
Helm et al.

(10) Patent No.: US 11,718,545 B1
(45) Date of Patent: Aug. 8, 2023

(54) SEPTIC SYSTEM

(71) Applicants: Glenn Jonathan Helm, Yakima, WA (US); Peter Paul Helm, Yakima, WA (US)

(72) Inventors: Glenn Jonathan Helm, Yakima, WA (US); Peter Paul Helm, Yakima, WA (US)

(*) Notice: Subject to any disclaimer, the term of this patent is extended or adjusted under 35 U.S.C. 154(b) by 0 days.

(21) Appl. No.: 17/893,219

(22) Filed: Aug. 23, 2022

(51) Int. Cl.
| | | |
|---|---|---|
| C02F 3/28 | (2023.01) | |
| C02F 1/00 | (2023.01) | |
| B01D 29/56 | (2006.01) | |
| B01D 35/26 | (2006.01) | |
| B01D 36/00 | (2006.01) | |

(52) U.S. Cl.
CPC ............. *C02F 3/288* (2013.01); *B01D 29/56* (2013.01); *B01D 35/26* (2013.01); *B01D 36/001* (2013.01); *C02F 1/004* (2013.01); *B01D 2201/184* (2013.01); *B01D 2201/202* (2013.01); *C02F 2201/005* (2013.01); *C02F 2203/006* (2013.01); *C02F 2209/03* (2013.01); *C02F 2209/40* (2013.01); *C02F 2209/42* (2013.01)

(58) Field of Classification Search
None
See application file for complete search history.

(56) References Cited

U.S. PATENT DOCUMENTS

| | | | | |
|---|---|---|---|---|
| 6,231,764 | B1* | 5/2001 | Wilkins | B01D 35/0276 210/393 |
| 2003/0155311 | A1* | 8/2003 | Chaffin | C02F 1/76 210/194 |
| 2005/0205491 | A1* | 9/2005 | Helm | C02F 3/06 210/151 |
| 2009/0294356 | A1* | 12/2009 | Beggs | C02F 3/04 210/275 |
| 2014/0352812 | A1* | 12/2014 | Dulin | C02F 1/42 137/468 |

* cited by examiner

*Primary Examiner* — Richard C Gurtowski
(74) *Attorney, Agent, or Firm* — Michael D. Eisenberg

(57) ABSTRACT

The systems and methods herein are directed a wastewater management system which can be used on a housing unit. The wastewater management system includes a septic tank, pump tank, pressure tank, and pods residing within a drainfield.

20 Claims, 14 Drawing Sheets

2 Bedroom – 240 gallons ÷ 36 gal. per day = 7 pods

| Soil Type | Gal./SF | Drainfield Required | Pods x Minimum SF | Total SF each |
|---|---|---|---|---|
| 1 & 2 | 1.0 | 240 SF | 7 x 60 | 420 |
| 3 | 0.8 | 300 SF | 7 x 60 | 420 |
| 4 | 0.6 | 400 SF | 7 x 60 | 420 |
| 5 | 0.4 | 600 SF | 7 x 90 | 600 |
| 6 | 0.2 | 1200 SF | 7 x 180 | 1200 |

3 Bedroom – 360 gallons ÷ 36 gal. per day = 10 pods

| Soil Type | Gal./SF | Drainfield Required | Pods x Minimum SF | Total SF each |
|---|---|---|---|---|
| 1 & 2 | 1.0 | 360 SF | 10 x 60 | 600 |
| 3 | 0.8 | 450 SF | 10 x 60 | 600 |
| 4 | 0.6 | 600 SF | 10 x 60 | 600 |
| 5 | 0.4 | 900 SF | 10 x 90 | 900 |
| 6 | 0.2 | 1800 SF | 10 x 180 | 1800 |

4 Bedroom – 480 gallons ÷ 36 gal. per day = 14 pods

| Soil Type | Gal./SF | Drainfield Required | Pods x Minimum SF | Total SF each |
|---|---|---|---|---|
| 1 & 2 | 1.0 | 480 SF | 14 x 60 | 840 |
| 3 | 0.8 | 600 SF | 14 x 60 | 840 |
| 4 | 0.6 | 800 SF | 14 x 60 | 840 |
| 5 | 0.4 | 1200 SF | 14 x 86 | 1204 |
| 6 | 0.2 | 2400 SF | 14 x 172 | 2408 |

FIG. 14

SEPTIC SYSTEM

FIELD OF INVENTION

The present invention relates to systems and methods for a septic system.

BACKGROUND OF THE INVENTION

Biological wastewater treatment is the process of removing organic and biological contaminants from wastewater via biological processes. Its objective is to produce an environmentally safe fluid waste stream suitable for disposal or reuse.

Biological wastewater treatment may be aerobic (which take place in the presence of oxygen) or anaerobic (which occur in the absence of oxygen). In both processes, a portion of biological contaminants in water (e.g. sugars, fats, organic short-chain carbon molecules, etc.) is digested by bacteria and broken down into simpler components, while another portion is bound into floc.

A surface mounted wastewater treatment unit is mounted on a selected substrate such as a scarified native soil. A watertight receiving basin is located on the substrate, and contains a lower medium suitable for support of biological growth and a granular medium above the lower medium. A standpipe introduces wastewater to be treated at a pressure, and such wastewater is distributed to the lower medium at the lower reaches of the basin. This is in contrast to the present disclosure where effluent is introduced at a bottom of a pod. Due to the pressure at which the wastewater is introduced, the wastewater flows up through the lower medium, and then by capillary action through the granular medium. The granular medium extends to the outside of the basin and descends to the native soil or to a collection unit. Thus, the treated wastewater moving the through the granular medium can be collected or absorbed into the native soil.

The lower medium and/or the granular medium may become clogged with floc and have to be replaced after a certain time period. Moreover, landscaping regulations may limit the geometry of the basin, constraining the height difference between the source of the effluent wastewater and the basin, and thus affecting the pressure of the effluent wastewater.

BRIEF SUMMARY OF EMBODIMENTS OF THE INVENTION

In a variant, a system for treating sewage and waste water, comprises: an inlet line operatively connected to a septic tank, wherein the inlet line receives an influent, wherein the influent contains solids which sink to a bottom surface of the septic tank, wherein the septic tank operatively connected to a pump tank, wherein the pump tank comprises an alarm float, a pump float, and a turbine pump thereby yielding a liquid for conversion to effluent; a pump house operatively connected to the pump tank, wherein the pump house comprises a pressure tank, a pressure switch, a disc filter, one or more cartridge filters, flush line, and one or more emitter modules; one or more output lines operatively connected to one or more pods via one or more emitter modules, wherein the one or more emitter modules are encapsulated in a respective pipe or arranged in series and configured to transport effluent to the one or more pods, wherein the one or more pods is configured to receive the effluent in response to the liquid moving through the disc filter and the one or more cartridge filters; and soil surrounds to the one or more pods, wherein the one or more pods contain sand.

In another variant, the effluent is held at a pressure flow between 30-50 pounds per square inch (PSI) via a check valve.

In yet another variant, the pump tank further comprises a pump float switch.

In still yet another variant, each emitter module of the one or more emitter modules reduces effluent flow from a pressure flow between 30-50 PSI to a drip flow at a respective pod of the one or more pods.

In a further variant, effluent flows into the sand and flows down to the soil.

In yet another further variant, the one or more pods are composed of plastics.

In still yet another further variant, the one or more pods comprises a sand screen.

In still yet another further variant, the septic tank is operatively connected to the pressure tank via a high pressure pump.

In still yet another further variant, the disc filter is 100 microns.

In still yet another further variant, the one or more cartridge filters are 5 microns or 50 microns.

In still yet another further variant, the one or more emitter modules are arranged in a parallel configuration, series configuration, or a combination of parallel and series configurations.

In still yet another further variant, the check valve is operatively connected to a true union ball valve, thereby preventing backflow of the effluent.

In still yet another further variant, the pump house further comprises insulation.

In still yet another further variant, the pressure tank is operatively connected to an air valve.

In still yet another further variant, the flush line is operatively connected to the pump tank.

In still yet another further variant, the pump house operates at 120 volts and 20 AMPs.

In still yet another further variant, the one or more pods are installed on sloping sites.

In still yet another further variant, the one or more emitter modules contain pressure compensators.

In still yet another further variant, the septic tank comprises a first portion and a second portion.

In still yet another further variant, the one or more emitter modules are disposed on a side opposite to the pressure tank.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 14 is a depiction of a table listing the soil types, gallons handled by the wastewater management system; drain field, number of pods of the wastewater management system; and square footage of the pod setup, in accordance with an embodiment of the invention.

DETAILED DESCRIPTION OF THE EMBODIMENTS OF THE INVENTION

The systems and methods herein are directed alleviate poor soil conditions by providing purified water or aqueous solutions (i.e., effluent) to soil for irrigation and gardening purposes. Though the reasons for poor soil may differ, the wastewater management systems, as disclosed herein (e.g., Epod Septic System®), can be applied across soil conditions due to shorelines, glacial soil, streams, and wetlands. These make the soil less than ideal for drainage. In addition, some of our most sensitive ecosystems exist in the areas that are most densely populated. The wastewater management system herein encompasses a control panel, valves, check valves, septic lids, and pump tank lids, which direct the flow of effluent to landscaping containing drain fields. The septic lids and pump tank lids may be air and water tight, while also being easily removed and replaceable via standard tools. The valves and check valves may be accessible for adjustments and/or replacements.

Figure 2:
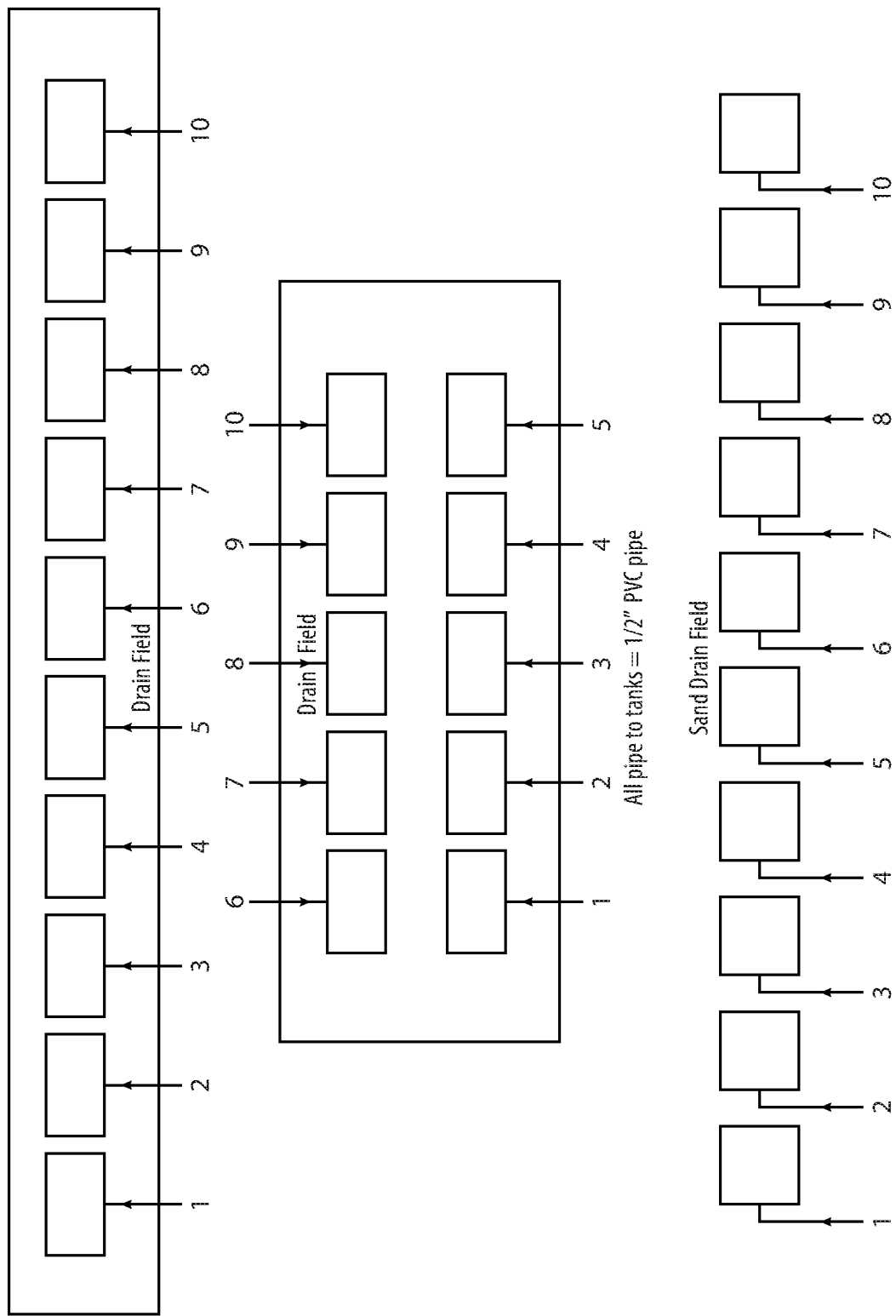
FIG. 2 is a depiction of a drain field, in accordance with an embodiment of the invention.
Figure 4:
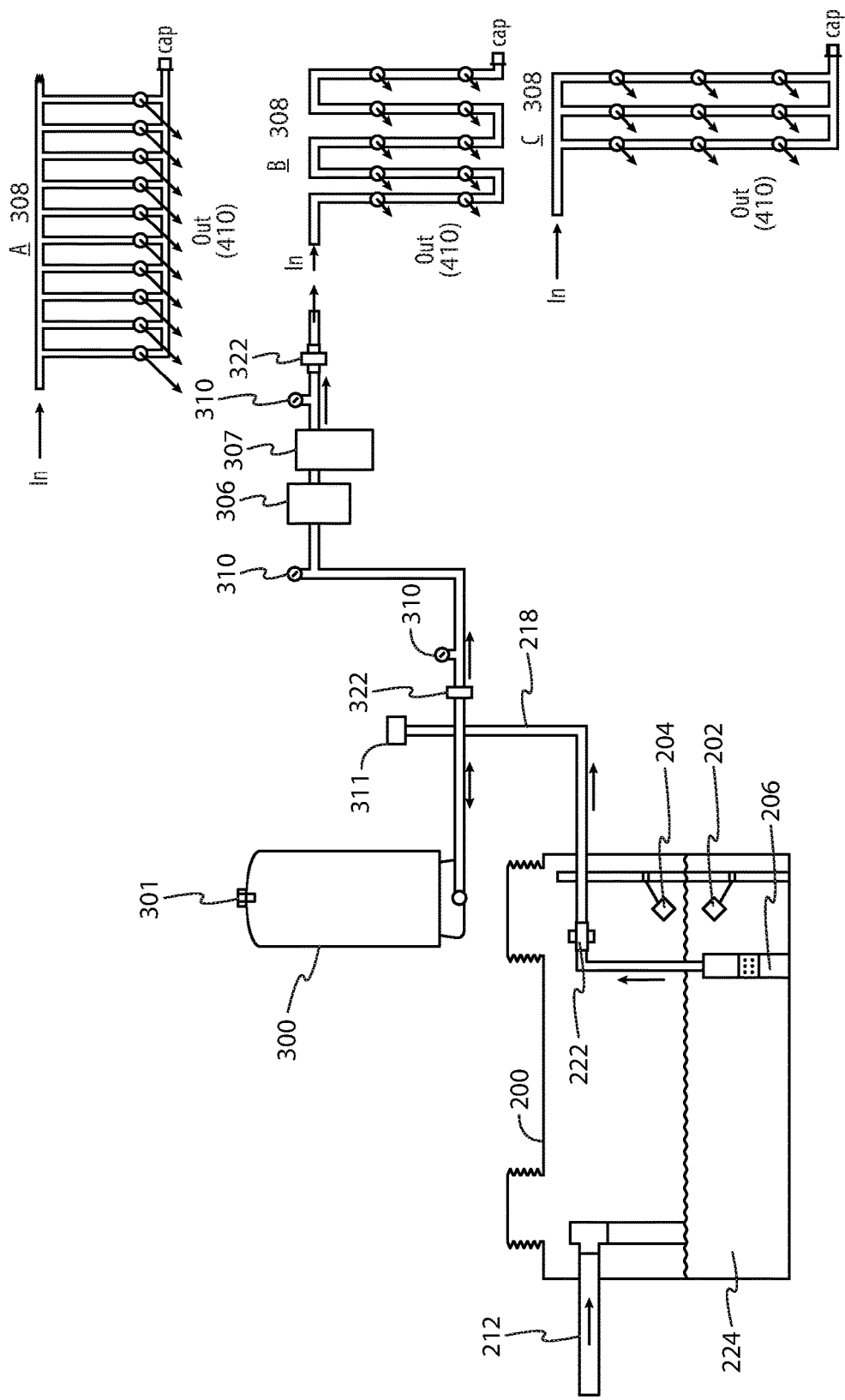
FIG. 4 is a depiction of emitter modules operatively connected to the wastewater management system, in accordance with an embodiment of the invention.

In the wastewater management system herein, raw sewage flows from the source (i.e., the house) into a two-compartment septic tank where the principle settling of the raw sewages occurs (i.e., the liquid phase separates from the solid phase material of the raw sewage). The septic tank has a filter on the outlet baffle to trap suspended solids before entering the pump tank. The liquid becomes an effluent which enters the pump tank and moves through other filter(s) to the emitter modules. The emitter modules continuously release a fixed volume of wastewater into the drainage field. Different types of drainage fields are also depicted in FIG. 2. The emitter modules may reside in an insulated equipment shed, as depicted in FIG. 4.

Soil, water, and ground conditions, which allow for the advantageous effects of the wastewater management system herein, are listed below. Installation of the wastewater management system herein can be done in dry weather and soil and the integrity of the soil is maintained. Tracked vehicles are used on the drain fields at all times. The ground should be cleared of vegetative debris in installation area, while avoiding backhoes; rutting and compaction of soil; and wet soil from rain. In case of rain, allow for the soil to dry prior to implementing the wastewater management system herein. Ground and surface water should be kept away from on-site septic area (i.e., streams, ponds, etc.) and drains should be kept at an appropriate distance from the pods. Additionally, water should not be allowed to pool in or around the pods. Suitable ground conditions have the on-site septic located the appropriate distance away from banks and drop offs.

Aesthetic advantages of the wastewater management system herein include: (i) compatibility with retaining walls which create a canvas for landscaping options, while allowing for added yard space and decorative features for plants and shrubs; (ii) changeability of gardening with bulbs, plant flowers, seeds, herbs, and vegetables; (iii) facilely removable shrubs with small-roots and low-cost foliage; and (iv) growth of ornamental grasses which rapidly grow and can be integrated with other foliage and/or flowers.

Figure 1:
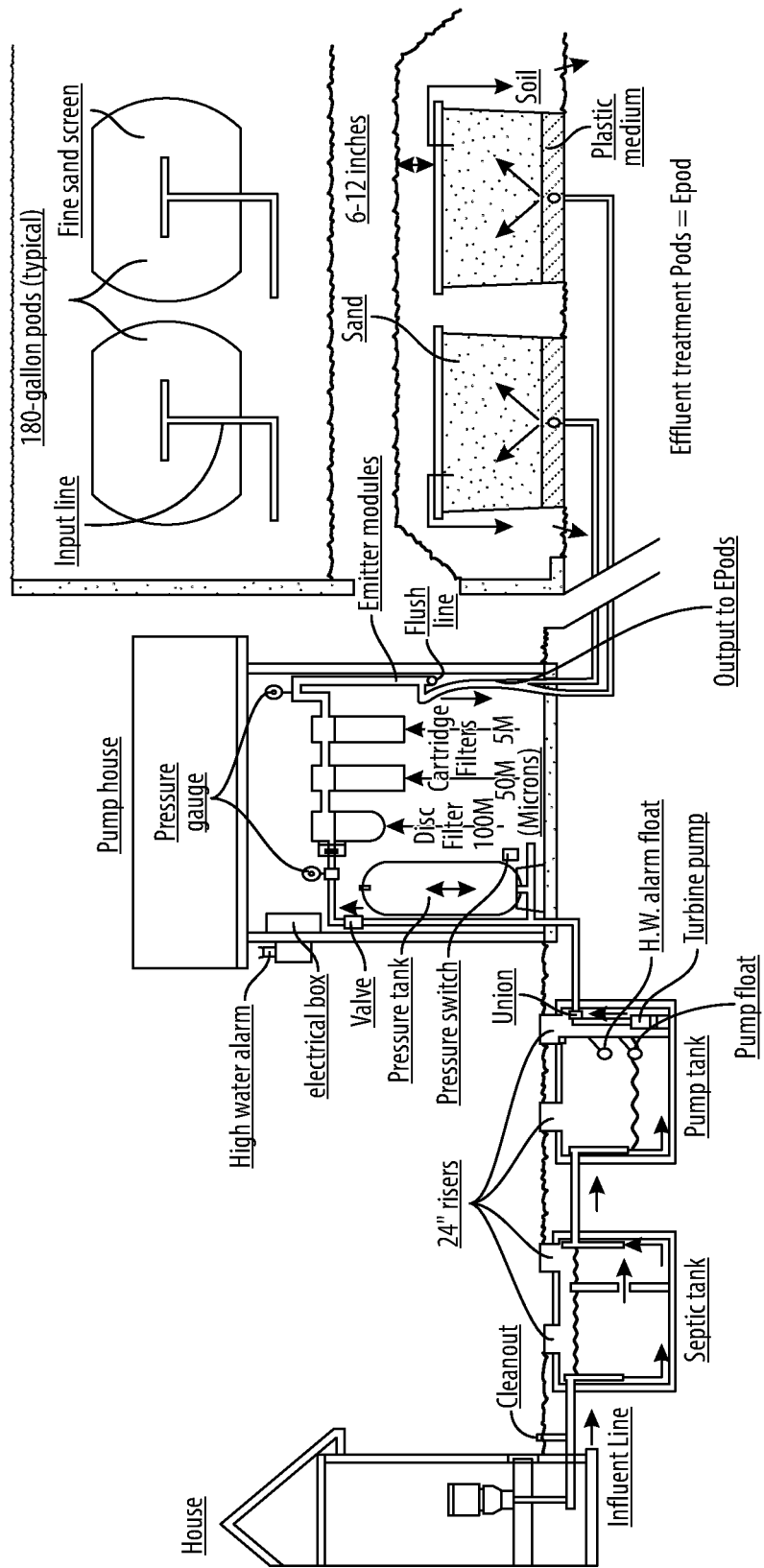
FIG. 1 is a depiction of a block diagram of a wastewater management system connected to a house, in accordance with an embodiment of the invention.

Referring to FIG. 1, sewage (influent) flows from the house to the two-compartment septic tank. A first compartment of septic tank receives the influent, where heavy solids sink to the bottom and the lighter materials float on the surface. The liquid in the middle flows into the second compartment and fills to the level of the output pipe, which contains a cleanable filter. The liquid then flows into the input of the pump tank (i.e., effluent).

The pump tank holds: (i) the pump float and the high-water float; and (ii) the submersible high-pressure pump. When both the pump float switch and the pressure switch are closed, the pump begins to pump effluent into the pressure tank until the pressure switch opens and shuts off the pump. The effluent is held at a high pressure (30-50 PSI) due to the check valve in the pump.

Effluent flows from the pressure tank through the disc filter, through the cartridge filters, and to the input of the emitter modules. The emitter modules change the high pressure to a drip flow at the output, as controlled by the interior construction of each module. Each drainfield pod has a corresponding emitter module. For example, ten pods have ten modules. From the modules, through the check valves (if needed), the effluent is transported to the drainfield pods at the drainfield location. More specifically, effluent is introduced to the bottom of each pod, rises up, and then wicks over the rim and down to the receiving soil.

The following part numbers correspond to the labelled components in the figures as listed in the table below.

| Description | Part Number | Description | Part Number | Description | Part Number | Description | Part Number |
|---|---|---|---|---|---|---|---|
| Septic Tank | 100 | Pump Tank | 200 | Pressure Tank | 300 | Plastic tank | 400 |
| Clean Out | 102 | Pump float | 202 | Air valve | 301 | Plastic media 4" deep typical | 402 |
| Alarm Panel | 104 | High Water Alarm Float | 204 | Disc Filter | 302 | Sand Screen | 404 |
| Influent line from House | 106 | Submersible Pump | 206 | Lines to EPOD | 304 | Sand ASTM | 406 |
| 24" Risers | 108 | PVC pipe ASTM 3034 | 212 | Cartridge Filters | 306 | Pod input lines | 410 |
| Septic Tank Effluent Filter | 110 | PVC pipe to pressure tank | 218 | Cartridge Filter | 307 | | |
| | | Union | 222 | Emitter Modules | 308 | | |
| | | Collected effluent from septic tank to be treated | 224 | 5 micron cartridge filter | 309 | | |
| | | 1 ¼ Male Adapter TXS | 226 | Pressure Meters | 310 | | |
| | | 1 ¼ Schedule 40 PVC | 228 | Pressure Switch | 311 | | |
| | | 1 ¼ × 1' Tee SXS | 232 | Equipment housing | 312 | | |
| | | Hose Bib | 234 | Ball Valve | 314 | | |
| | | 1 × ¾ Tee SXT | 236 | Manual or Auto Flash Line | 318 | | |
| | | 1 Schedule 40 PVC Length | 237 | True Union Ball Valve | 322 | | |
| | | OSI Clip | 246 | 3" Conduit | 305 | | |
| | | 1" Cap | 248 | 1" Union | 321 | | |
| | | 4" PVC Tee | 205 | | | | |

Referring to FIG. 2, the wastewater management system herein includes a drain field equipped with multiple units of tank 400 (or pods). In an embodiment, there are 10 pods in a single row in the drain field. In another embodiment, there are 5 pods in a first row and another 5 pods in a second row in the drain field. In yet another embodiment, there are 10 pods in a single row at least partially buried in a sand drain field. The PVC pipes in the pods may be operatively connected to emitter module 308.

In an embodiment, a unit of tank 400 may: (i) hold up to 180-gallons where: (a) 60 gallons of the basin is allocated to water and (b) 120 gallons of the basin is allocated to sand plastic; and (ii) be used as a soil dispersal component. Effluents from components located in the equipment shed may be received by a bottom port (i.e., pod input line 410) of the unit of tank 400. The effluent fills the unit of tank 400 unit until the wicking actions of sand pull the effluent up and over the rim of the unit of tank 400, thereby the effluent slowly disperses into the soil. The unit of tank 400 may be installed on top of the soil, thereby negating any problems with a high-water table. The unit of tank 400 may be filled with water or sand without exterior support. The minimum soil depth is 12" and ground water table is greater than 12 inches.

In an embodiment, the unit of tank 400 is composed of durable low density polyethylene (LDPE), which is heat and cold resistant and resistant to rust (i.e., limited discoloration). Additionally, the unit of tank 400 holds fertilizers, oil solvents, and animal feeds without chemically altering said fertilizers, oil solvents, and animal feeds. Rim braces are disposed in between the ends of the rim of the unit of tank 400 and the body of the unit of tank 400. The bottom surface of the unit of tank 400 is 33" and the rim is 48", which surrounds the mouth, which is 44".

In an embodiment, water freezes in the unit of tank 400. The frozen water becomes a block of ice which conforms to the shape of the unit of tank 400. The length and width of the unit of tank 400 is 63" and 47", respectively, before freezing. The length and width of the unit of tank 400 is 61.5" and 49.5", respectively, after freezing. The length and width of the unit of tank 400 is 62.75" and 47.75", respectively, immediately after the block of ice is removed. The length and width of the unit of tank 400 is 63" and 47", respectively, a short time after the block of ice is removed. Thus, the unit of tank 400 withstands freezing without splitting.

E-240 variant of the wastewater management system herein treats up to 240 gallons of water per day, which uses 7 emitter modules for 7 pods, wherein each pod of the 7 pods store up to 60 gallons of water in the basin. E-360 variant of the wastewater management system herein treats up to 360 gallons of water per day, which uses 10 emitter modules for 10 pods, wherein each pod of the 10 pods store up to 60 gallons of water in the basin. E-480 variant of the wastewater management system herein treats up to 480 gallons of water per day, which uses 14 emitter modules for 14 pods, wherein each pod of the 14 pods store up to 60 gallons of water in the basin.

Figure 3:
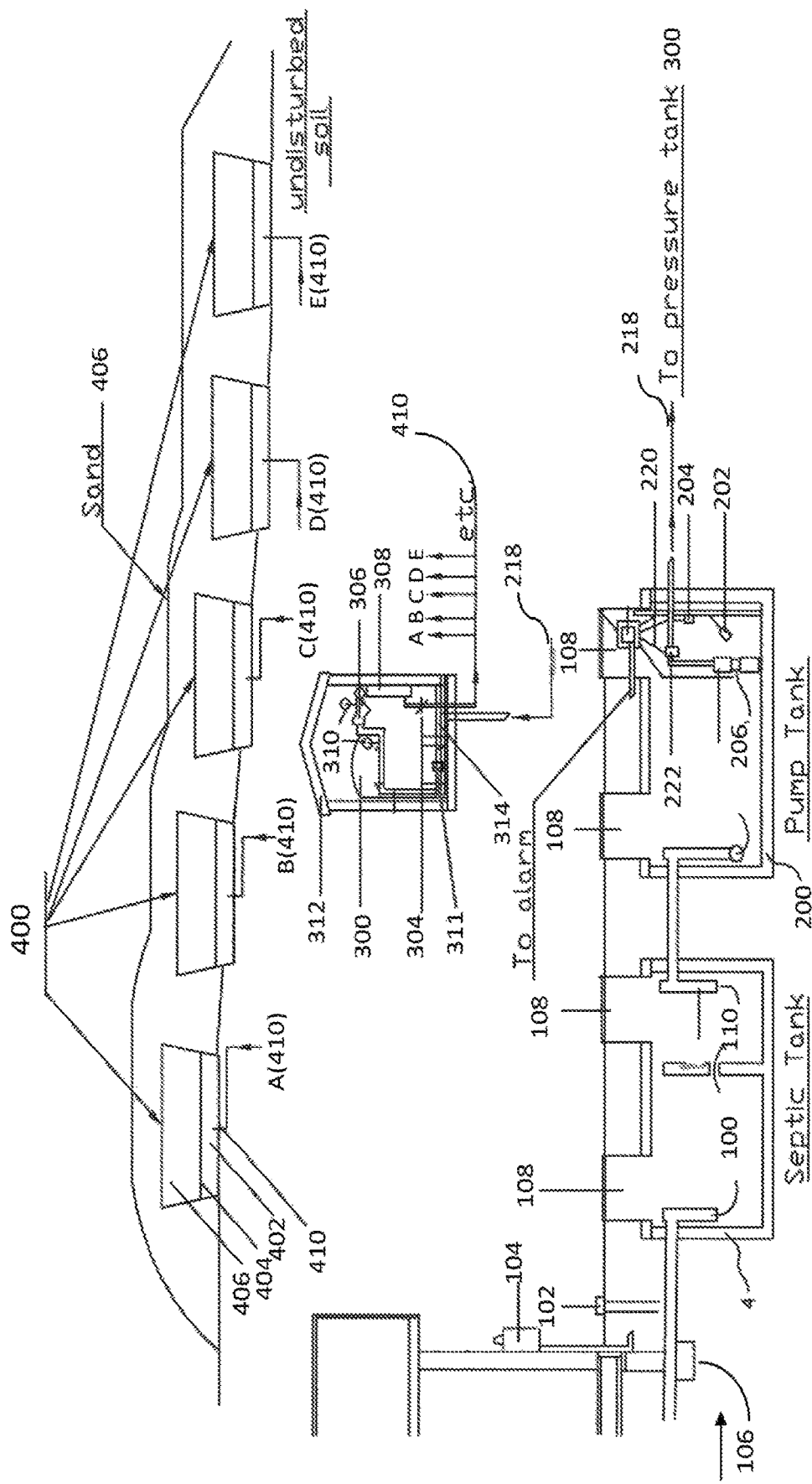
FIG. 3 is a depiction of a septic tank, pump tank, pressure tank, and pods of the wastewater management system, in accordance with an embodiment of the invention.

Referring to FIG. 3, the electrical pressure switch is located inside the riser of pump tank 200 and all other connections are placed on the side of the house, allowing a small insulated pumphouse to be located near the EPod drainfield when the drainfield is some distance from the pump tank, and eliminate the need for electrical circuits in the pumphouse. FIG. 3 shows 5 pods (tank 400) on a sloping site in sand 406 (of ASTM grade). Each pod comprises a pod input line 410. On the top surfaces of septic tank 100, 24" risers 108 are disposed, which are also level with risers 108 disposed on the top surfaces of pump tank 200. Influent line 106 connects septic tank 100 to the house, wherein the house comprises alarm panel 104 and clean out 102 disposed above a portion of influent line 106. Septic tank effluent filter 110 operatively connects septic tank 100 and pump tank 200. Submersible pump 206 is disposed on the bottom surface of pump tank 200. Union 202 operatively connects submersible pump 206 and PVC pipe to pressure tank 218, which transports effluent to pressure tank 300. Pressure tank 300 resides within equipment housing 312, which is equipped with pressure meters 310, pressure switch 311, cartridge filter 306, and emitter module 308. Each of the emitter module 308 is operatively connected to lines to EPod 304, which are operatively connect to respective units of pod input lines 410, which are operatively connect to respective units of plastic tank 400.

Referring to FIG. 4, collected effluent from septic tank to treated 224 is received in pump tank 200 from PVC pipe 212 of ATM 3034 variant. Pressure switch 311 is operatively connected to PVC pipe 212, air valve 301, and true union ball valve 322. Cartridge filters 306 and 307 reside along the same piping connection, which are operatively connected to pressure meter 310 and true union ball valve 322. True union ball valve 322 is operatively connected to emitter module 308.

Figure 5:
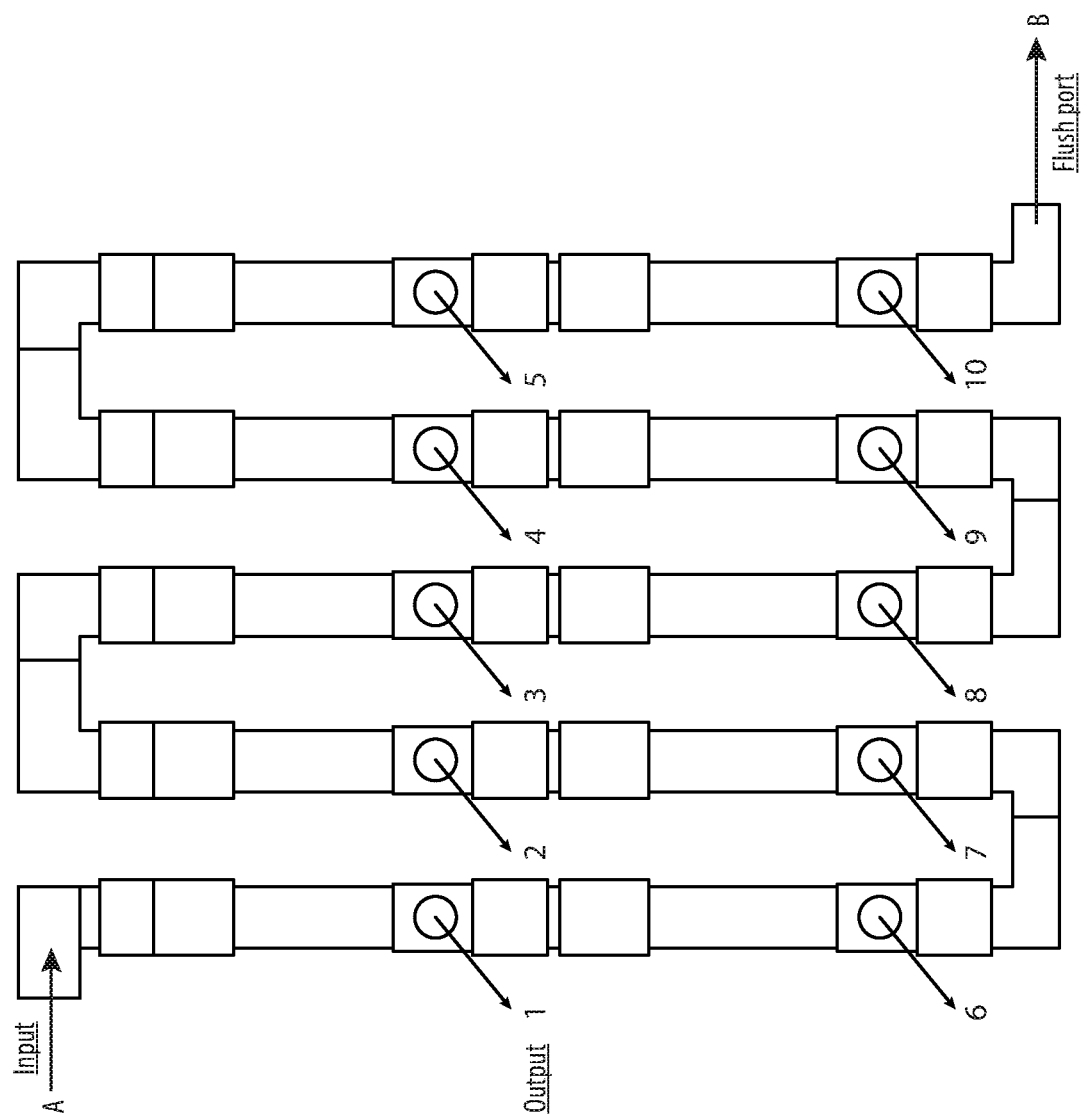
FIG. 5, FIG. 6, and FIG. 7 are depictions of the emitter modules, in accordance with an embodiment of the invention.

As also depicted in FIG. 5, "A" corresponds to the input where the effluent comes from the pressure tank, disc, and cartridge filters. The effluent is under pressure and set between 30 to 50 psi. The pressure is equal throughout the complete modular array. "B" has the same pressure as "A" when the flow is very slow. "B" is capped or optionally have an emitter-controlled output returned to the pump tank. This flushing flow can be designed for various rates (e.g., 12 gal/day to 48 or 60 gal/day or more). "B" corresponds to the flush or capped exit. There is no flow when capped. Slow flow is designed for continuous flow, where a manual valve can also be used. "B" may be connected to another module array to increase more of the emitter outputs (1-10). When internal flow from input to output is sufficiently slow, pressure drop is negligible. "1-10" correspond to outlets which are the low pressure/low flow-controlled flow point fed to the EPods located in the drain field. Each outlet is manufactured for desired output rated at gallons per day. "Output" of each port (1-10) are pressure compensated so the flows to the drain field pods are equal even as the input pressure varies. Additionally, the flow to each pod is essentially equal even if the drain field pods are at different heights.

Referring to FIG. 3-FIG. 7, emitter module 308 are installed into an enclosure (e.g., equipment housing 312), outside of the basin. The enclosure is configured as to allow for emitters to be changed if one or more the emitters fail via quick disconnector components disposed on the emitter bank. An insulation layer may be disposed along the right edge of equipment housing 312. The enclosure may be a PVC pipe where one or more emitters are used for a predetermined water flow, thereby preventing flow to the bottom the basin. The floats (e.g., pump float 202 and high water alarm float 204) comprise two internal contacts. When the float is above the surface of water, a steel ball or mercury closes the circuit. A bubbler in the second compartment of the septic tanks reduced the bod by bubbling in oxygen (i.e., pretreatment).

Emitter module 308 are the controlling unit of the systems and methods herein, where drip emitters are installed inside a plastic module. Emitter module 308 are easily replaced. Drip emitters take high pressure effluent and convert effluent to low volume and potential high pressure. Few emitters can be used. For example, forty-eight gallon/day flow uses only two 24 gal/day emitters inside each emitter module. Output flow to drain field pods is slow and continuous as long as effluent is available, up to 24 hours per day. Flow of effluent is fixed by amount and sizes of emitters. Emitters are protected from damage from outside sources, such as animals, tree roots, and so forth. There are no drip emitters in drain field pods. The emitters can be continuously flushed at a controlled rate or manually flushed. There is no need to balance the flow to each pod after exiting the emitter modules, even on sloping sites. The flow of the emitter modules can be tested for proper flow and replaced if needed. Drip emitters are pressure compensated so changing pressures still emit approximately the same output. Each receiving pod, basin, tank, etc. that may be used, is fed by a respective emitter module with its own appropriate volume rate. The modules, since they are not installed at the bottom of the pods, can be located inside the equipment pumphouse (shed) near the drain field to keep the feeding pipe runs to a minimum. Emitter array may have a check valve as needed to prevent backflow on sloping sites, where no timer is required. The volume of effluent emitted is determined by the internal makeup of the modules and is based on a 24-hour period. For example, if a design volume (360 gal/day) is available to the pump, the wastewater management system herein operates a total of 24 hours. If less than 360 gal, the wastewater management system herein shuts down for one or more times when determining if the pump float is up (On) or down (off). If more than 360 gallons/day, the effluent build ups in the pump tank.

Emitter module 308 are installed inside the pump house and therefore easily accessible. Emitter module 308 can be tested, flushed or replaced if needed. The replaced emitter module 308 can be checked, refurbished, and reused if brought back up to factory specifications. Plugging or partial plugging can reduce flow. The emitter module 308 can be protected by filters, such as cartridge filters and disc filter. Emitter module 308 are not installed in the soil or at the bottom of the pods and digging in the dirt, whereby removal of the pod plastic or sand medium is not needed. Emitter replacement(s) are in the pump house unless noted otherwise. Burrowing animals cannot chew through the driplines if the driplines are not in the soil in the first place. The lines feeding the drain field pods can be ½" PVC pipe to each pod. If one line is to break or be cut, the only amount to leak is the amount controlled by the emitter module. The smaller pod (60 gallons of water in the basin) holds approximately one yard of media (plastic media and sand per pod) internal volume plus the cover above the sand of 9 to 12 inches. Over time the internal mix of the pod may develop some resistance to the up flow of the effluent; eventually have to be removed; and become replaced with new sand. When the internal volume of sand is relatively small (+1 yard each), it is manageable to replace the old sand with new material without the need to bring in heavy equipment and damage the landscaping. The replacement sand, (10 yards for 10 pods) can be brought in with a Bob-Cat or equivalent smaller equipment if the situation required it. The drain field should, in most cases, not have to be moved to the reserve area since the existing drainfield soil received mostly clean water. The removed sand can be spread out over the existing cover sand which will be aerobically and ultraviolet treated back into clean sand. To achieve equal loading of the tank unit 400 under varying pressure and deviating heights, the systems and methods herein provide equal amounts of effluent to as many pods as are used (e.g., 10 pods for 360 gal/day or 13 for 480 gal/day) without needing to balance the flow to each pod since that is been designed into the emitter modules located in the equipment shed. Not only does the loading of each pod remain equal under changing pressure or sloping ground or both, but the output of each emitter is isolated from each other so if 9 out of 10 were plugged, the remaining emitter still puts out the same volume, as achieved by a disc filter of 2 cartridge filters in series. The first filter is 50 microns and the second filter is 5 microns. When the flow through the filters is slow, pressure drop is relatively low. The filters are replaced when clogged. The emitter module 308 put out about the same amount of effluent, even with varying pressures and sloping sites, and push through flow resistance that may develop inside the pod. If clogging occurs in the sand layer inside the pod, the emitter module 308 builds up pressure at the input of the pod, thereby pushing through any restrictive layer and continue up and over the rim by the wicking action of the sand and down to the soil.

Figure 6:
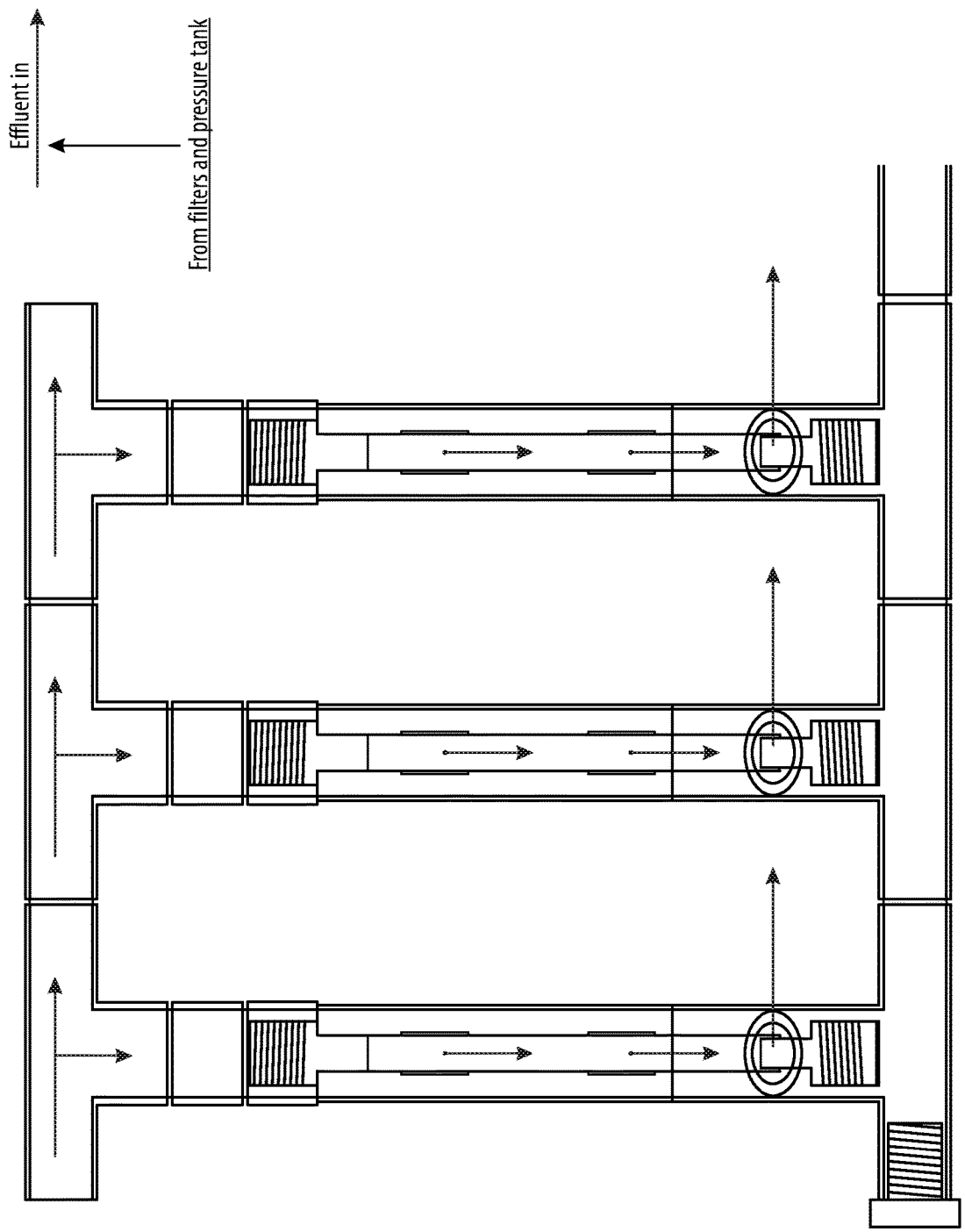

Referring to FIG. 6, three units of emitter module 308 are arranged in a parallel configuration. Additional unit of emitter module 308 may be included to the three units to increase the output of effluent.

Figure 7:
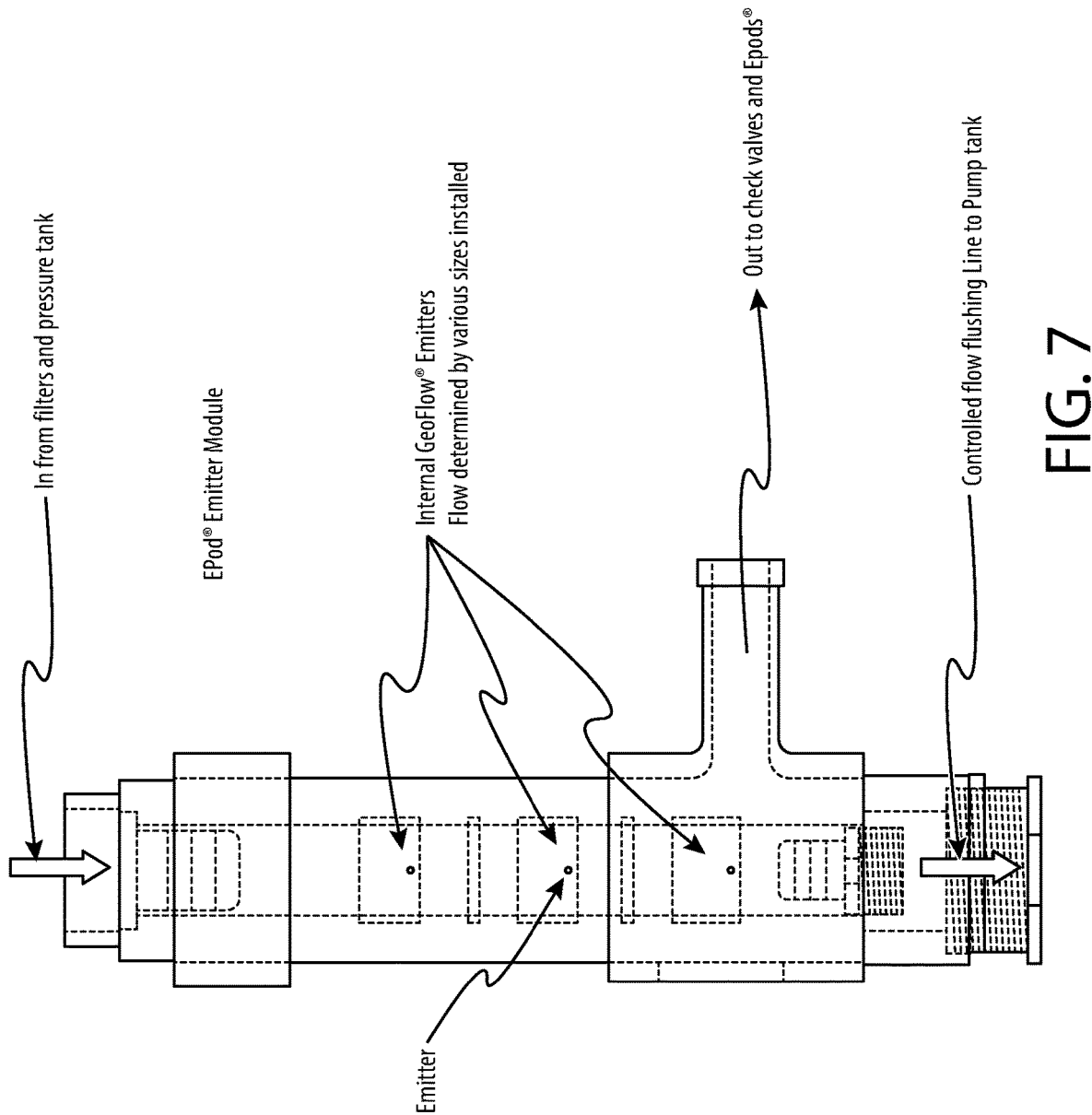

Referring to FIG. 7, a single unit of emitter module 308 is depicted which can be arranged in one or more arrays, parallel with other units of emitter module 308, or series with other units of emitter module 308. There are segments of emitter module 308, as depicted in FIG. 7, which are operatively connected to each other to construct emitter module 308. A single unit of emitter module 308 may be encapsulated in a 1 inch PVC pipe. Multiple units of emitter module 308 may be configured in series in which the emitter flows out of the PVC pipe through a ½ inch opening, such that the flow of the effluent is determined by the discharge properties of the effluent from the emitter module 308. The effluent flows to the EPod 304.

Figure 8:
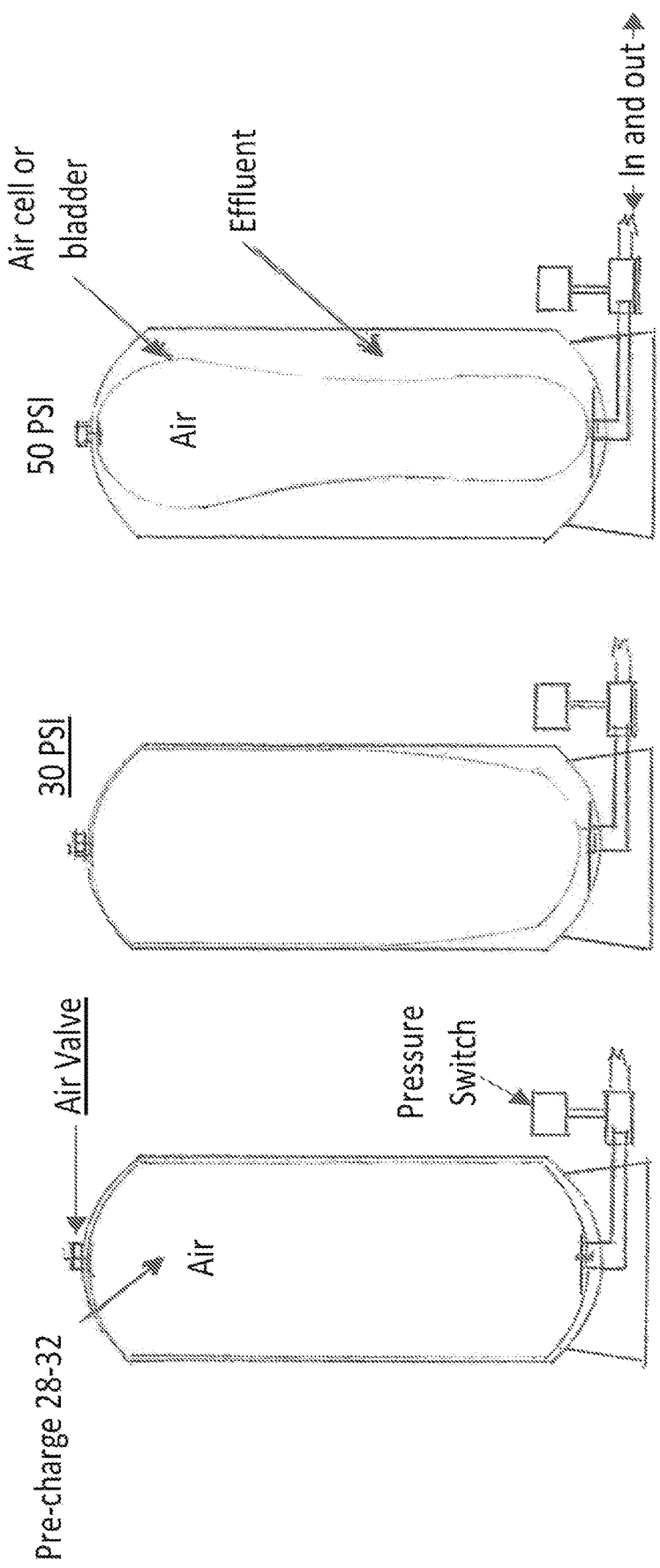
FIG. 8 is a depiction of a pressure tank, in accordance with an embodiment of the invention.

Referring to FIG. 8, the pressure tank 300 is empty, at 30 PSI, or at 50 PSI, which are each equipped with air valve 301. When empty, the pressure switch 311 is closed. At 30 PSI, the pressure switch is closed and the pump float (switch) lifts and closes. The pressure rises to 30 PSI rapidly to pre-charge setting then slowly up to the pressure switch setting. At 50 PSI, the float switch and the pressure switch 311 are closed for the pump operate. Effluent is forced into pressure tank 300 until a pressure 50 PSI is reached. The pressure switch opens contacts and pump stops. Effluent slowly discharges through filters and emitter modules until 30 PSI is reached. Pressure switch closes and the cycle repeats until the pump float lowers and its internal contacts open. When the water in the pump tank refills and lifts float, the process then repeats.

Figure 9:
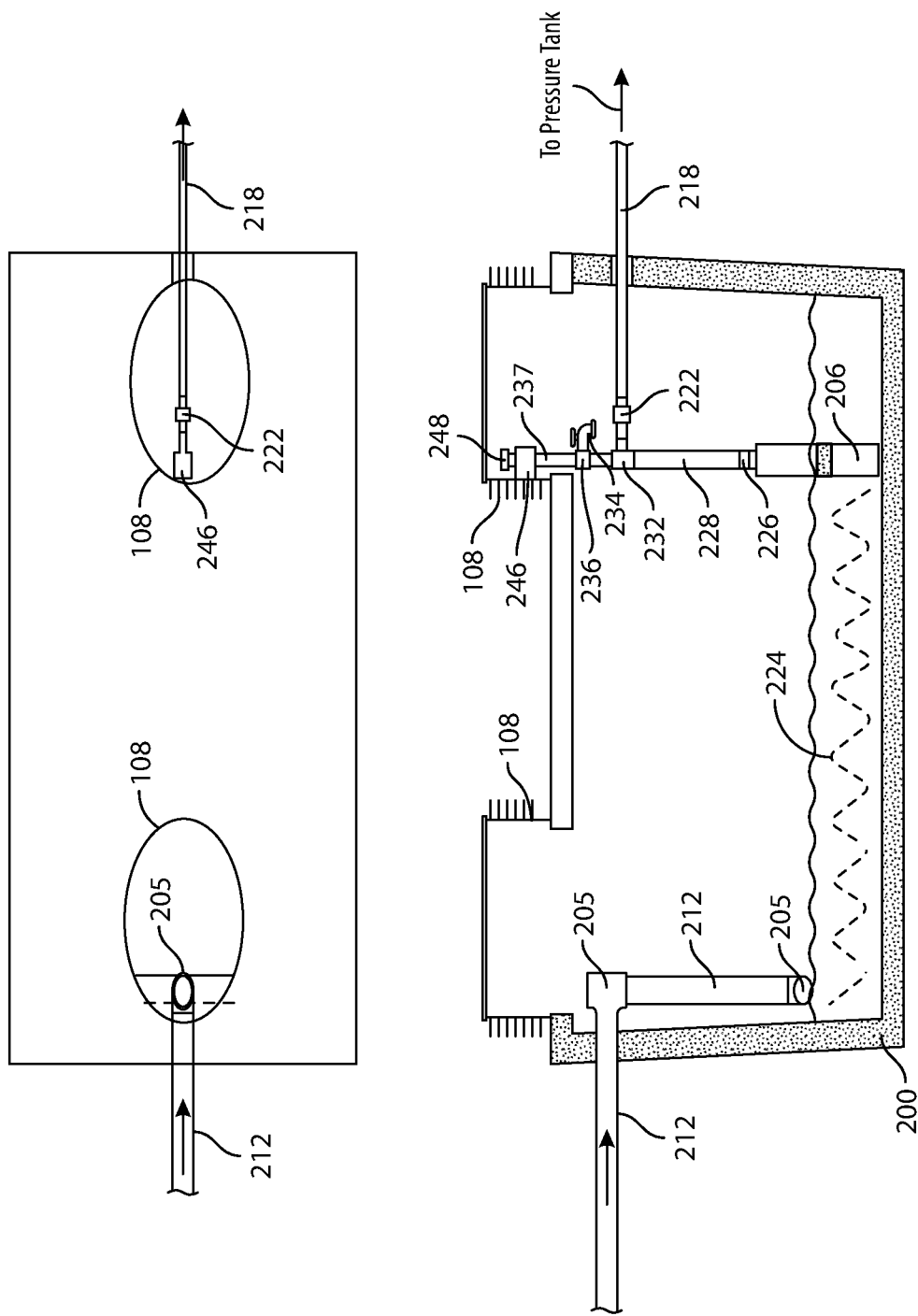
FIG. 9 is a depiction of a pump tank plumbing, in accordance with an embodiment of the invention.
Figure 10:
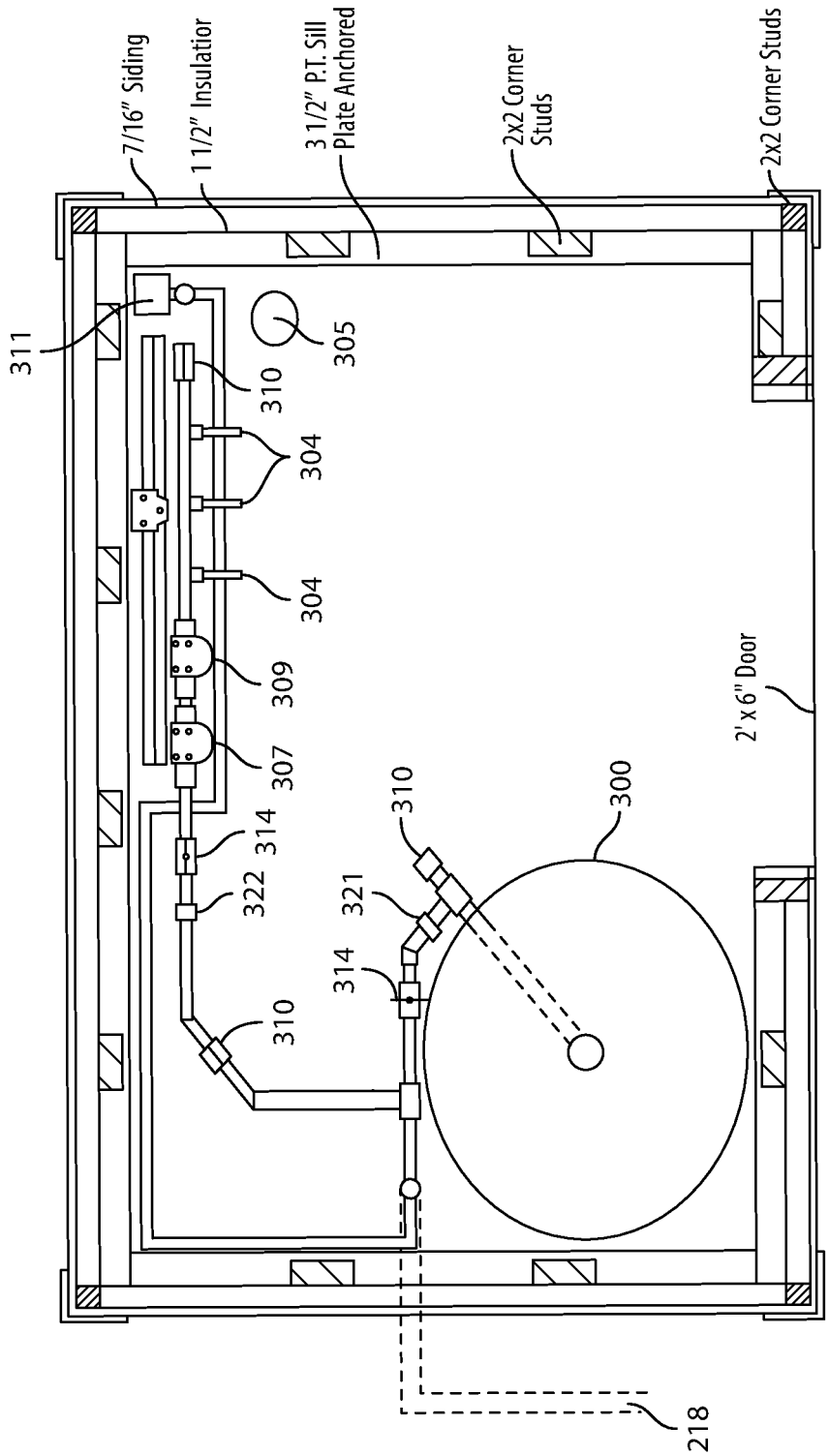
FIG. 10 is a depiction of a pumphouse, in accordance with an embodiment of the invention.

Referring to FIG. 9, plumbing in pump tank 200 is depicted. PVC pipe 212 is operatively connected to 4" PVC tee 205, which is contained within a first unit of 24" Risers 108. OSI clip 246 is operatively connected to union 222, which is contained within a second unit of 24" Risers 108, which is operatively connected to PVC pipe (to pressure tank) 218. The second unit of 24" Risers 108 further comprises 1¼ Male Adapter TXS 226, 1¼ Schedule 40 PVC 228, 1¼×1' Tee SXS 232, Hose Bib 234, 1×¾ Tee SXT 236, 1 Schedule 40 PVC Length 237, OSI clip 246, and 1" Cap 248. The arrangement of these components in the second unit of 24" Risers 108 allow for effluent to be transported to the equipment housing located near the drainfield.

Figure 11:
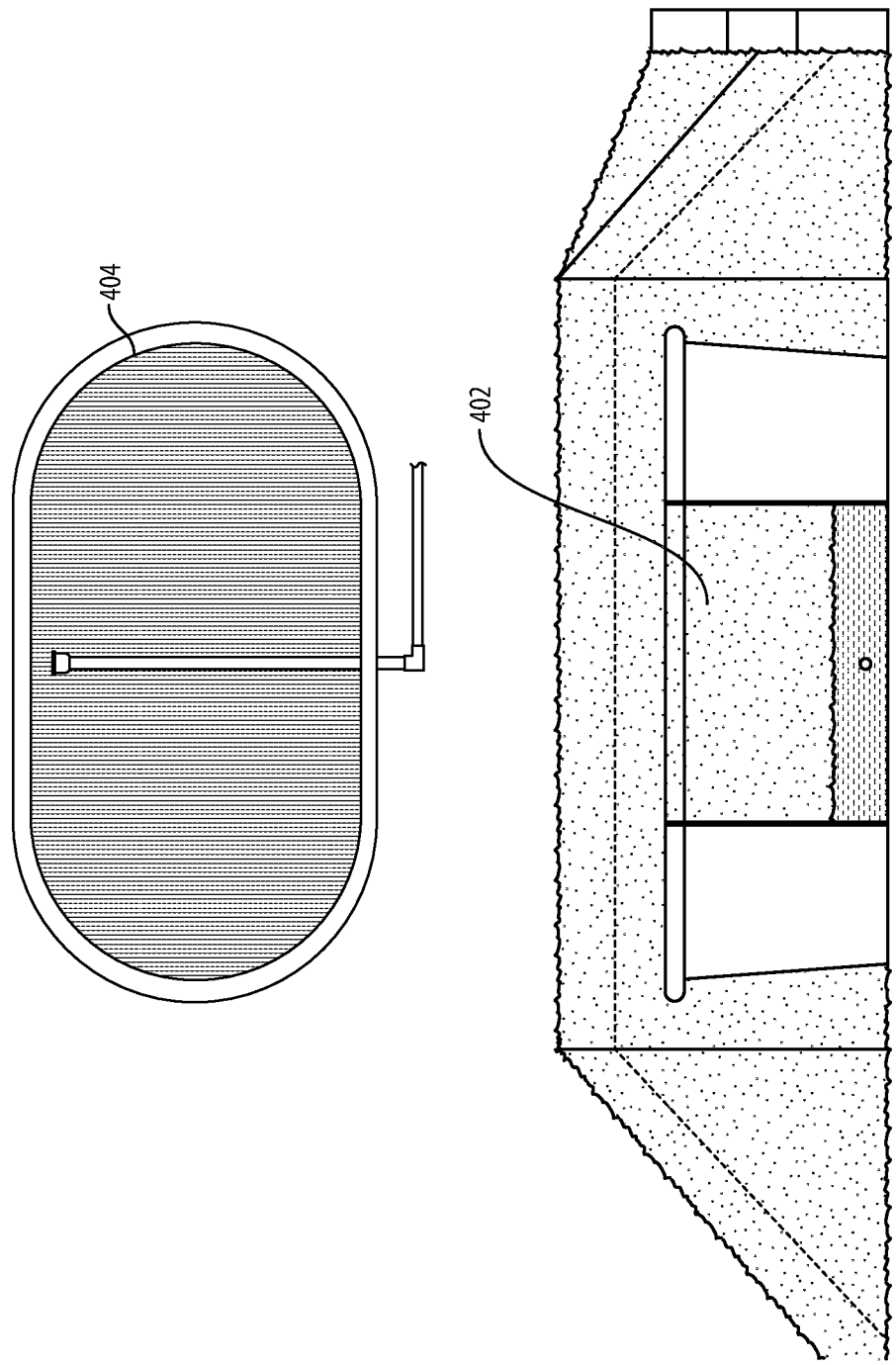
FIG. 11 is a depiction of the pod in a drain field, in accordance with an embodiment of the invention.

Referring to FIG. 11, a unit of a plastic tank 400 (i.e., pod) is depicted (e.g., 180-gallon variant) on a side view and top view of a typical constructed drainfield section. The pod is placed on a level section of undisturbed receiving soil with an optional retaining wall with a 4" or more of plastic medium 402 as the base layer, a fine mesh sand screen 404, and the remainder is sand 406 (e.g., C-33) filling the pod to and over the rim and to the drainfield soil. The pod is fed by pipe (218) to the bottom input (410) and into the inner layer of plastic medium 402 of plastic tank 400.

Referring to FIG. 11, a smaller equipment housing is depicted which holds a pressure tank, disc filter, and emitter module 308. For example, 3" conduit 305 operatively connects to multiple lines to the pods (i.e., plastic tank 410). A first unit of pressure meter 310 is operatively connected to pressure tank 300 and 1" union 321, which are operatively connected to ball valve 314. Ball valve 314 is also operatively connected to a second unit of pressure meter 310, wherein the second unit of pressure meter 3210 is operatively connected to true union ball valve 322 and ball valve 214. Filters are connected in series (e.g., cartridge filter 307 and 5 micron filter 309) with lines to EPOD 304, which are operatively connected to pressure meters 310 and pressure switch 311.

Figure 12:
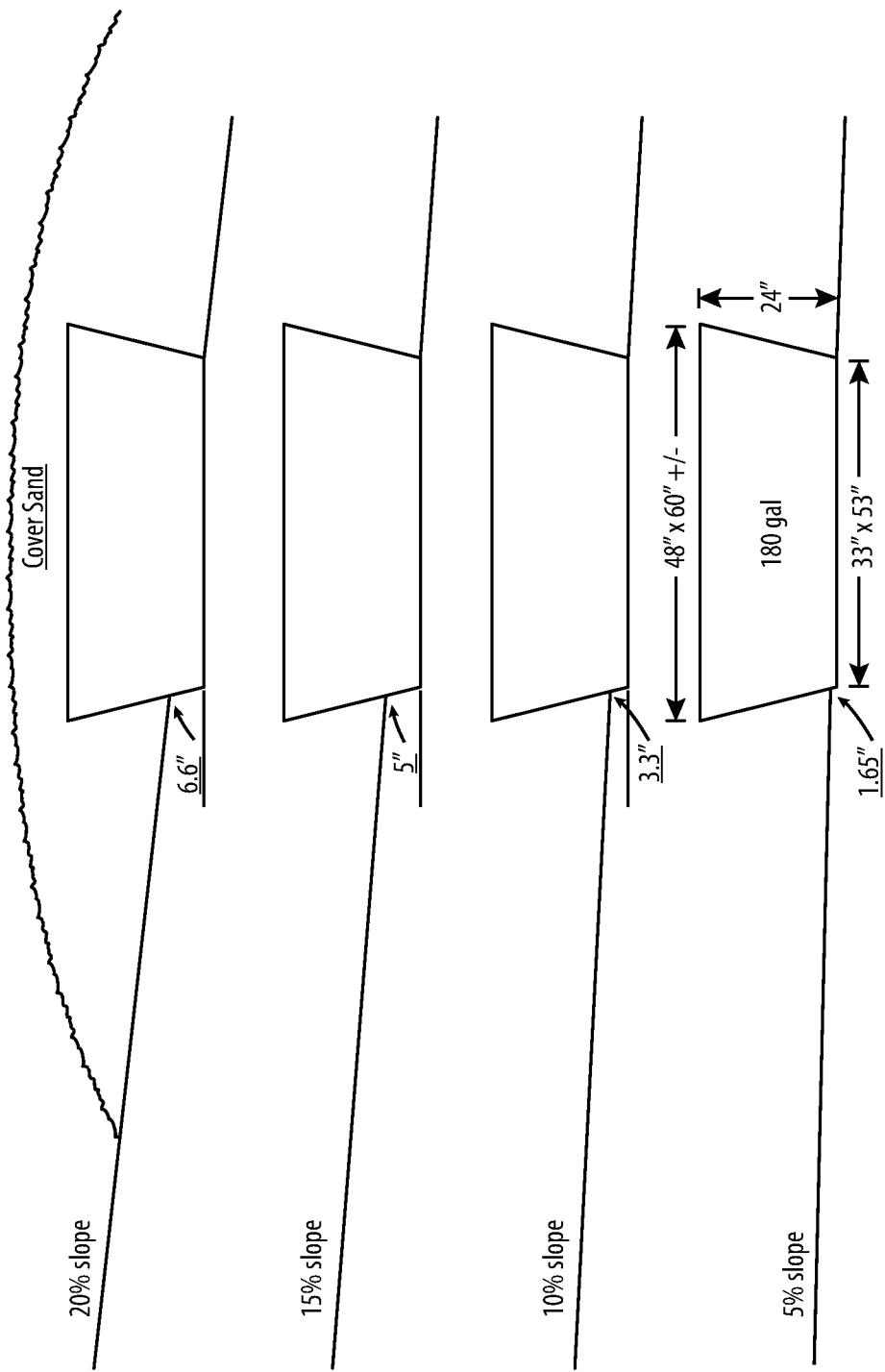
FIG. 12 is a depiction of pods installed on sloping sites, in accordance with an embodiment of the invention.

Referring to FIG. 12, a unit of plastic tank 400 is disposed at one or more slopes (5 degrees to 20 degrees). A cut into the sand is utilized to achieve a level rim of unit of plastic tank 400.

Figure 13:
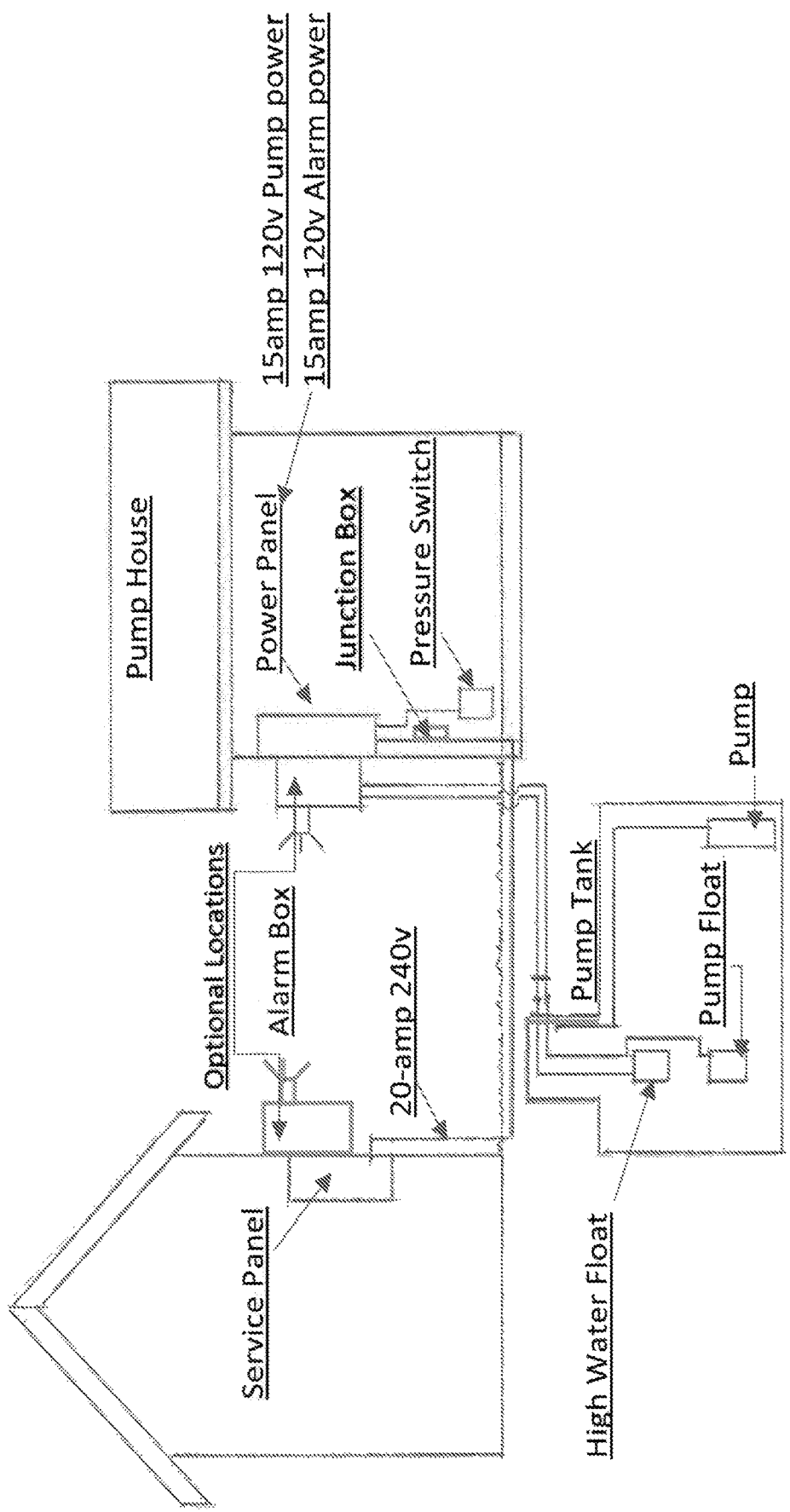
FIG. 13 is a depiction of electrical connections which work in combination with the wastewater management system, in accordance with an embodiment of the invention.

Referring to FIG. 13, an example of a housing configuration with amperage is depicted to implement the wastewater management system herein. Other amperages and voltages can be used to implement the wastewater management system herein.

Referring to FIG. 14, a table lists pod configurations for a 2-bedroom, 3-bedroom, and 4-bedroom house. The soil types are either of 1, 2, 3, 4, 5, and/or 6 types. The 2-bedroom is connected to the wastewater management system herein comprising 7 pods. The 3-bedroom is connected to the wastewater management system herein comprising 10 pods. The 4-bedroom is connected to the wastewater management system herein comprising 14 pods.

Other Embodiments

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which does not depart from the spirit or scope of the present inventive discovery. Such modifications are also intended to fall within the scope of the appended claims.

REFERENCES CITED

All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

What is claimed is:

1. A system for treating sewage and waste water, comprising:
   an inlet line operatively connected to a septic tank, wherein the inlet line receives an influent, wherein the influent contains solids which sink to a bottom surface of the septic tank, wherein the septic tank is operatively connected to a pump tank, wherein the pump tank comprises an alarm float, a pump float, and a submersible pump thereby yielding a liquid for conversion to effluent;
   a pump house operatively connected to the pump tank, wherein the pump house comprises a pressure tank, a pressure switch, a disc filter, one or more cartridge filters, flush line, and one or more emitter modules, wherein each of the one or more emitter modules is encapsulated in a respective pipe and configured to transport the effluent out of the pump house;
   one or more pods configured to receive the effluent transported out of the pump house;
   one or more output lines operatively connecting the one or more pods to the one or more emitter modules, wherein the one or more pods is configured to receive the effluent in response to the liquid moving through the disc filter and the one or more cartridge filters; and
   wherein the one or more pods contain sand, the one or more pods being configured to be at least partially buried in sand and supported by soil.

2. The system of claim 1, wherein the submersible pump is configured to be activated when enough effluent is present in the pump tank to lift the pump float, so as to pump the effluent into the pressure tank until pressure in the pressure tank reaches 50 PSI, such that pressure flow of effluent discharged from the pressure tank to the one or more emitter modules is held at a pressure flow between 30-50 pounds per square inch (PSI).

3. The system of claim 1, wherein the pump float further comprises a pump float switch.

4. The system of claim 1, wherein each emitter module of the one or more emitter modules reduces effluent flow from a pressure flow between 30-50 PSI to a drip flow at a respective pod of the one or more pods.

5. The system of claim 1, wherein effluent flows from the one or more pods into the sand partially burying the one or more pods and flows down to soil supporting the one or more pods.

6. The system of claim 1, wherein the one or more pods are composed of plastics.

7. The system of claim 1, wherein the one or more pods comprises a sand screen.

8. The system of claim 1, wherein the septic tank is operatively connected to the pressure tank via the submersible pump.

9. The system of claim 1, wherein the disc filter is 100 microns.

10. The system of claim 1, wherein the one or more cartridge filters are 5 microns or 50 microns.

11. The system of claim 1, comprising a plurality of the emitter modules, the emitter modules being arranged in a parallel configuration, series configuration, or a combination of parallel and series configurations.

12. The system of claim 1, comprising a true union ball valve operatively connected to the one or more emitter modules, thereby preventing backflow of the effluent.

13. The system of claim 1, wherein the pump house further comprises insulation.

14. The system of claim 1, wherein the pressure tank is operatively connected to an air valve.

15. The system of claim 1, wherein the flush line is operatively connected to the pump tank.

16. The system of claim 1, wherein the pump house operates at 120 volts and 20 AMPs.

17. The system of claim 1, wherein the one or more pods are installed on sloping sites.

18. The system of claim 1, wherein the one or more emitter modules contain pressure compensators.

19. The system of claim 1, wherein the septic tank comprises a first portion and a second portion.

20. The system of claim 1, wherein the one or more emitter modules are disposed on a side of the pump house opposite to the pressure tank.

* * * * *